2,934,554
Patented Apr. 26, 1960

2,934,554

DIALKYLPHOSPHITOALKYL ACRYLATES AND METHACRYLATES AND PROCESS FOR PREPARING SAME

Constance A. Lane, Philadelphia, Pa., assignor to Rohm & Haas Company, Philadelphia, Pa., a corporation of Delaware No Drawing. Application December 11, 1957
Serial No. 701,960

9 Claims. (Cl. 260—461)

The present invention relates to polymerizable phosphorous ester derivatives of hydroxyalkyl esters of $\alpha,\beta$-ethylenically unsaturated monocarboxylic acids, and more particularly to dialkylphosphitoalkyl acrylates and methacrylates, and to a process for preparing same, as well as polymers and copolymers containing such esters. The novel polymerizable esters of this invention comprise a new class of compounds, which contain as distinct and separate groups within their structure both an ester group derived from an $\alpha,\beta$-ethylenically unsaturated monocarboxylic acid and an ester group derived from phosphorous acid, these groups being attached to the same divalent saturated aliphatic hydrocarbon group.

These new compounds have the general formula:

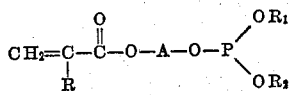

wherein R is a hydrogen atom or a methyl group, A is a straight-chain, branched or cyclic alkylene group having two to six carbon atoms, and $R_1$ and $R_2$ each represent an alkyl group having one to four carbon atoms, or when taken together represent an alkylene group having two to six carbon atoms.

Typical compounds within the scope of this invention are the following:

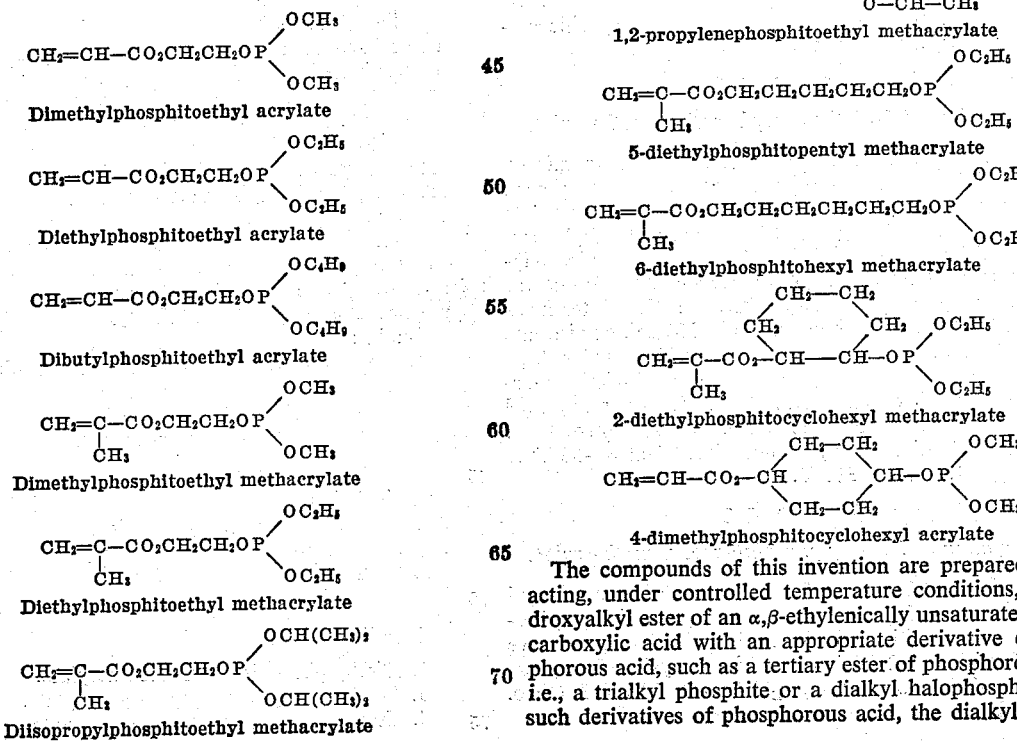

The compounds of this invention are prepared by reacting, under controlled temperature conditions, an hydroxyalkyl ester of an $\alpha,\beta$-ethylenically unsaturated monocarboxylic acid with an appropriate derivative of phosphorous acid, such as a tertiary ester of phosphorous acid, i.e., a trialkyl phosphite or a dialkyl halophosphite. Of such derivatives of phosphorous acid, the dialkyl chlorophosphites are preferred starting materials for this reaction, which is best carried out in the presence of a hydrogen halide acceptor such as pyridine, triethylamine, dimethylaniline or the like. An inert solvent such as benzene, toluene, chloroform or the like may also be employed to advantage to assist in bringing about the reaction.

The hydroxyalkyl esters of $\alpha,\beta$-ethylenically unsaturated monocarboxylic acids used as starting materials in accordance herewith are exemplified by 2-hydroxyethyl acrylate, methacrylate, 2-hydroxypropyl methacrylate, 4-hydroxybutyl methacrylate, 5-hydroxypentyl methacrylate, 6-hydroxyhexyl methacrylate, 2-, 3-, or 4-hydroxycyclohexyl methacrylate, and the like.

Trialkyl phosphites which are suitable as starting materials in the practice of this invention include trimethyl phosphite, triethyl phosphite, and the like.

Dialkyl chlorophosphites which may be used as starting materials include dimethyl, diethyl, diisopropyl, ethylene, propylene chlorophosphites, and the like.

The hydroxyalkyl esters of $\alpha,\beta$-ethylenically unsaturated monocarboxylic acids which are used as starting materials in accordance with this invention are prepared according to published procedures, e.g., by reaction of the $\alpha,\beta$-ethylenically unsaturated monocarboxylic acids with ethylene or propylene oxide—see, for instance, United States Patent No. 2,484,487—or by direct esterification of these acids with the appropriate glycol—see for instance, British Patent No. 595,881—or by reaction of the acid chlorides with the appropriate glycol—see, for instance, United States Patent No. 2,335,813 and Burtle, Saam and Mokrasch, J. Org. Chem. 17, 1302 (1952)—or by the reaction of the alkali metal salts of these acids with ethylene or propylene chlorohydrin—see, for instance, United States Patent No. 2,129,722—or by other miscellaneous methods—see, for instance, United States Patent No. 2,338,967 and United States application Serial No. 623,302, filed November 20, 1956.

The phosphorous-containing reagents which are used as starting materials in accordance with this invention are either commercially available or may be prepared from readily available intermediates according to published procedures—see, for instance, Cook, Ilett, Saunders, Stacey, Watson, Wilding and Woodcock, J. Chem. Soc. 1949, 2921, and Lucas, Mitchell and Scully, J. Amer. Chem. Soc. 72, 5491 (1950).

The following examples further illustrate specific embodiments of this invention.

EXAMPLE 1

*Preparation of 2-diethylphosphitoethyl methacrylate*

In a 500 ml. 3-neck flask, equipped with a stirrer, thermometer and small Vigreux column, were placed 90 grams (0.69 mole) of 2-hydroxyethyl methacrylate (U.S. 2,484,487), 115 grams (0.69 mole of triethyl phosphite, and 2.0 grams of N,N'-di-2(1,4-naphthoquinonyl)-p-phenylenediamine. The top of the Vigreux column was fitted with a downward distillation take-off. After heating to 150° C. for four hours a total of 39 ml. of distillate was collected. Distillation of the residue under high vacuum gave 55 grams (32% yield) of 2-diethylphosphitoethyl methacrylate, B.P. 90–120°/0.02 mm., $n_D^{25}$ 1.4418, 10.6% P (theo. 12.4%), sap. No. 450 (theo. 450). Upon redistillation the monomer distilled at 80–93°/0.1 mm.; $n_D^{25}$ 1.4405, 11.3% P.

EXAMPLE 2

*Preparation of 2-diethylphosphitopropyl methacrylate*

Reaction of 72 grams (0.5 mole) of 2-hydroxypropyl methacrylate and 83 grams (0.5 mole) of triethyl phosphite under conditions similar to those in Example 1 gave a 48% yield of 2-diethylphosphitopropyl methacrylate, B.P. 120–145° C./0.2 mm., $n_D^{25}$ 1.4381, 10.7% P (theo. 11.8% P).

EXAMPLE 3

*Preparation of ethylenephosphitopropyl methacrylate*

In a one liter 3-neck flask, equipped with a stirrer, thermometer, addition funnel, condenser and drying tube, were placed 72 grams (0.5 mole) of 2-hydroxypropyl methacrylate, 43.5 grams (0.55 mole) of pyridine, 500 ml. of anhydrous ether, and 1.0 gram of N,N'-di-2(1,4-naphthoquinonyl)-p-phenylenediamine. The reaction mixture was cooled to 5–10° C. and 63 grams (0.5 mole) of ethylene chlorophosphite (Lucas, Mitchell, Scully, J. Amer. Chem. Soc. 72, 5489 (1950)) was added over a period of thirty minutes. After filtration of the pyridine-hydrochloride and addition of 1.0 gram of N,N'-di-2(1,4-naphthoquinonyl)-p-phenylenediamine, the ether was removed under reduced pressure. Distillation gave 59 grams (51% yield) of ethylenephosphitopropyl methacrylate, B.P. 73–80° C./0.02 mm., $n_D^{25}$ 1.4635, sap. No. 524 (theo. 480), 12.6% P (theo. 13.3% P).

EXAMPLE 3a

*2-ethylenephosphitoethyl acrylate*

In a 200 ml. 3-neck flask, equipped with a stirrer, thermometer, addition funnel and a condenser fitted with a drying tube, were placed 11.6 grams (0.10 mole) of 2-hydroxyethyl acrylate, 8.7 grams (0.11 mole) of pyridine, 100 ml. of anhydrous ether, and 0.2 gram of hydroquinone. The reaction mixture was cooled to 0–5° C. and 12.6 grams (0.10 mole) of ethylene chlorophosphite (Lucas, Mitchell and Scully, J. Amer. Chem. Soc. 72, 5489 (1950)) was added over a period of one hour. The precipitated pyridine hydrochloride was removed by filtration and the ether removed under reduced pressure. The residue was a clear, yellow oil which amounted to 18.6 grams (90% yield) and was identified as 2-ethylenephosphitoethyl acrylate.

EXAMPLE 4

*Preparation of ethylenephosphitoethyl methacrylate*

In a manner similar to that described in Example 3, ethylenephosphitoethyl methacrylate, B.P. 75–80° C./0.02 mm., was obtained in 39% yield.

EXAMPLE 5

*Preparation of polymeric compositions*

2-diethylphosphitoethyl methacrylate polymerized to a soft flame-resistant rubber in the presence of azodiisobutyronitrile at 60° C. A mixture containing 16.0 grams of methyl methacrylate, 4.0 grams diethylphosphitoethyl methacrylate, and 0.02 gram of azodiisobutyronitrile was heated to 60° C. for 24 hours. The resultant, hard, clear, colorless polymer had an appreciable degree of flame-resistance. The degree of flame-resistance can be varied extensively by altering the composition of the copolymer.

*Usefulness of the invention.*—The compounds are useful monomers for polymerization and copolymerization with other acrylic esters to yield flame-resistant plastics, coatings, textile finishes, etc.

I claim:

1. A compound having the general formula

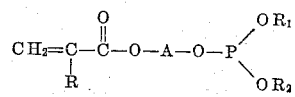

wherein R is a member of the class consisting of hydrogen and methyl, $R_1$ and $R_2$ each is a member of the class consisting of alkyl groups of not over four carbon atoms and when taken together represent an alkylene group having two to six carbon atoms, and A is a member of the class consisting of alkylene groups having two to six carbon atoms.

2. Diethylphosphitoethyl methacrylate.
3. Diethylphosphitopropyl methacrylate.
4. Ethylenephosphitoethyl methacrylate.

5. Ethylenephosphitopropyl methacrylate.
6. 1,2-propylenephosphitoethyl methacrylate.
7. A process for preparing a compound of the formula

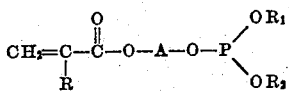

wherein R is a member of the class consisting of hydrogen and methyl, $R_1$ and $R_2$ each is a member of the class consisting of alkyl groups of not over four carbon atoms and when taken together represent an alkylene group having two to six carbon atoms, and A is a member of the class consisting of alkylene groups having two to six carbon atoms which comprises reacting by heating together in the presence of a free-radical polymerization inhibitor a compound of the formula

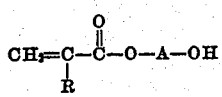

and a compound of the formula

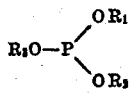

wherein R, A, $R_1$ and $R_2$ have the above meanings, and wherein $R_3$ is an alkyl group of not over four carbon atoms.

8. A process for preparing diethylphosphitoethyl methacrylate which comprises reacting triethyl phosphite with 2-hydroxyethyl methacrylate by heating together in the presence of a free-radical polymerization inhibitor.

9. A process for preparing diethylphosphitopropyl methacrylate which comprises reacting triethyl phosphite with 2-hydroxypropyl methacrylate by heating together in the presence of a free-radical polymerization inhibitor.

References Cited in the file of this patent
UNITED STATES PATENTS

| | | |
|---|---|---|
| 2,325,076 | Reuter | July 27, 1943 |
| 2,326,140 | Gzemski | Aug. 10, 1943 |
| 2,349,462 | Reuter | May 23, 1944 |
| 2,353,558 | Gzemski | July 11, 1944 |
| 2,636,027 | Coover et al. | Apr. 21, 1953 |
| 2,666,778 | Steinberg | Jan. 19, 1954 |
| 2,743,261 | Coover et al. | Apr. 24, 1956 |
| 2,765,331 | Whetstone et al. | Oct. 2, 1956 |

OTHER REFERENCES

Lucas et al.: "J. Am. Chem. Soc.," 72, 5491–7 (1950).

Hoffmann et al.: "J. Am. Chem. Soc.," 78, 5817–5821 (1956).